(12) United States Patent
Martwick

(10) Patent No.: US 6,336,158 B1
(45) Date of Patent: Jan. 1, 2002

(54) MEMORY BASED I/O DECODE ARRANGEMENT, AND SYSTEM AND METHOD USING THE SAME

(75) Inventor: Andrew W. Martwick, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/182,443

(22) Filed: Oct. 30, 1998

(51) Int. Cl.$^7$ .................. G06F 12/00; G06F 13/00; G06F 13/14; G06F 13/12; G06F 12/10

(52) U.S. Cl. .............. 710/104; 710/1; 710/3; 710/9; 710/10; 710/36; 710/101; 710/103; 710/107; 710/113; 710/126; 710/128; 710/129

(58) Field of Search .................. 710/129, 128, 710/3, 109, 101, 103, 1, 9, 10, 36, 104, 107, 113, 126; 711/100; 709/250, 201; 717/11; 370/428; 345/515

(56) References Cited

U.S. PATENT DOCUMENTS

| | | | | |
|---|---|---|---|---|
| 4,459,662 A | * | 7/1984 | Skelton et al. | 711/100 |
| 4,494,232 A | * | 1/1985 | Dambrackas et al. | 370/428 |
| 4,787,041 A | * | 11/1988 | Yount | 701/14 |
| 4,802,085 A | * | 1/1989 | Levy et al. | 710/3 |
| 5,568,621 A | | 10/1996 | Wooten | |
| 5,590,289 A | * | 12/1996 | Nardone et al. | 710/109 |
| 5,617,529 A | * | 4/1997 | Dao | 345/515 |
| 5,621,900 A | | 4/1997 | Lane et al. | |
| 5,668,949 A | * | 9/1997 | Nardone et al. | 709/201 |
| 5,737,610 A | * | 4/1998 | Sandig et al. | 717/11 |
| 5,740,376 A | * | 4/1998 | Carson et al. | 710/101 |
| 5,781,748 A | * | 7/1998 | Santos et al. | 710/128 |
| 5,790,831 A | * | 8/1998 | Lin et al. | 710/101 |
| 5,838,932 A | * | 11/1998 | Alzien | 710/128 |
| 5,857,084 A | * | 1/1999 | Klein | 710/129 |
| 5,864,688 A | * | 1/1999 | Santos et al. | 710/129 |

(List continued on next page.)

FOREIGN PATENT DOCUMENTS

| | | | | | |
|---|---|---|---|---|---|
| JP | 58144959 A | * | 8/1983 | | G06F/13/00 |
| JP | 60233751 A | * | 11/1985 | | G06F/12/06 |
| JP | 63067647 A | * | 3/1988 | | G06F/11/22 |
| JP | 01237843 A | * | 9/1989 | | G06F/11/22 |
| JP | 02012468 A | * | 1/1990 | | G06F/15/60 |
| JP | 06161880 A | * | 6/1994 | | G06F/12/02 |

OTHER PUBLICATIONS

"Two Way Mapping Device", IBM Tech. Disc. Bull., Feb. 1, 1969, V. 11, No. 9, pp. 1160–1161.*

(List continued on next page.)

Primary Examiner—Thomas Lee
Assistant Examiner—Katharina Schuster
(74) Attorney, Agent, or Firm—Antonelli, Terry, Stout & Kraus, LLP

(57) ABSTRACT

An input/output (I/O) decode arrangement including an I/O decode map in a form of a memory block and containing, before start of any bus I/O transactions, I/O address decode information useable for I/O address decoding for bus transaction ownership, for at least a portion of, and preferably all, possible I/O addresses in a system. Further included are: an I/O decode map pointer adapted to point to a memory address where said I/O decode map is located; an I/O decode cache adapted to cache said decode information with respect to ones of I/O addresses of which accessing has been previously performed with respect to said I/O decode map; and an I/O snooper/storer adapted to snoop said I/O decode map with any I/O address to retrieve said decode information corresponding to said I/O address, and further adapted to store retrieved said decode information into said I/O decode cache. The I/O decode map can be located within at least one of system management memory (SMM) or basic input/output system (BIOS) memory space. Implementation can further be made in a computing system and method.

23 Claims, 7 Drawing Sheets

U.S. PATENT DOCUMENTS

| | | | | |
|---|---|---|---|---|
| 5,884,027 | A | * | 3/1999 | Garbus et al. ............... 709/250 |
| 6,070,207 | A | * | 5/2000 | Bell ........................... 710/103 |
| 6,076,128 | A | * | 6/2000 | Kamijo et al. ............... 710/128 |
| 6,078,977 | A | * | 6/2000 | Klein .......................... 710/129 |
| 6,098,113 | A | * | 8/2000 | Heil et al. ...................... 710/1 |

OTHER PUBLICATIONS

"Swing–Mode Address Decode", IBM Tech. Disc. Bull., Mar. 1, 1985, V. 27, No. 10A, pp. 5711.*

"Peripheral Component Interconnect Daughter Card Configuration", IBM Tech. Disc. Bull., Sep. 1, 1994, V. 37, No. 9, pp. 435–440.*

Panda, P.R. et al. "Exploiting Off–Chip Memory Access Modes in High–Level Synthesis", Proceedings of the 1997 IEEE/ACM International Conference on Computer–aided Design, 1997, pp. 333–340.*

Schultz, k.J. et al. "Fully Parallel Integrated CAM/RAM Using Preclassification to Enable Large Capacities", Solid–State Circuits, IEEE Journal of, vol. 31, Issue 5, May 1996, pp. 689–699.*

Wu, Y.–J. et al. "A CAM–based Decorder of Convolutionally–Encoded Data", Circuits and Systems, 1991., IEEE International Symposium on, 1991, vol. 5, pp. 2955–2958.*

Shubat, A. et al. "Mappable Peripheral Memory for High Speed Applications", CompEuro '89., 'VLSI and Computer Peripherals', Proceedings, 1989, pp. 1/56–1/58.*

* cited by examiner

MEMORY BASED I/O DECODE ARRANGEMENT, AND SYSTEM AND METHOD USING THE SAME

FIELD OF THE INVENTION

The present invention generally relates to an arrangement, system and method for claiming bus transactions, and more specifically, relates to an arrangement, system, and method using memory based I/O decode.

BACKGROUND OF THE INVENTION

Over time, several I/O bus standards have evolved that specify protocols and interfaces for interfacing peripheral devices. These standards include Industry Standard Architecture (ISA), Extended Industry Standard Architecture (EISA) and other I/O bus standards. Recently, the Peripheral Component Interconnect (PCI) bus has gained wide acceptance as a primary I/O bus in the computer industry. The PCI bus standard provides for high bandwidth and flexibility that is independent of new processor technologies and increased processor speed, and computer system architects have designed large numbers of peripherals such as graphics, accelerators and SCSI disc drive controllers to be utilized with a PCI bus.

Generally, computer systems designed today that incorporate PCI bus capabilities also include a slower, secondary I/O bus (e.g., ISA bus described above) for compatibility with numerous legacy peripheral devices (e.g., floppy disk controllers and keyboard controllers) still existing and/or designed according to the old ISA standards. Many of these peripheral devices are still desired by computer users. Therefore, it is desirable to include, or to be able to incorporate, these existing peripheral devices that are designed to interface with older bus standards into a system that has a PCI bus. Of interest in this regard, a new Low Pin Count (LPC) Interface Specification providing interfacing between legacy I/O devices (e.g., floppy drive controllers and keyboard controllers) and a PCI bus was announced by Intel Corporation on Sep. 29, 1997.

As further relevant discussion, when performing bus transactions in a typical bus or multi-bus system, a master generates a bus transaction and sends it out on a bus (see FIG. 3). Agents on the bus perform a decoding operation on the address of the transaction to determine if the bus transaction is targeted to them (i.e., to determine if they are a target agent). If it is determined that a particular agent is the targeted device, then that agent positively claims the transaction. These types of agents are referred to herein as positive decode agents because they must decode the address of a bus transaction to determine ownership of that particular bus transaction.

The PCI bus standard specification incorporates one exception to positive decoding, i.e., such standard specifies that one agent on the bus may actually claim transactions without performing decoding. This agent is referred to herein as a subtractive decode agent. With regard to the operation of the subtractive decode agent, after all of the positive decode agents on the bus have decoded the address of a transaction and have been given first predetermined times (i.e., "right of first refusal" clock cycles) to determine that they do not own the transaction (i.e., see low-transitioning "fast" 320, "med" 322 and "slow" 324 assertions associated with the FIG. 3 timing chart labelled "(1) DEVSEL# (FROM POSITIVE DECODE AGENT 303a)"), the subtractive decode agent automatically claims ownership of the transaction by default at occurrence of a second predetermined time (i.e., see lowtransition "subtractive" 340 assertion associated with the FIG. 3 timing chart labelled "(2) DEVSEL# (FROM SUBTRACTIVE DECODE AGENT 303b)").

Art which may be relevant to the present invention may be found in: U.S. Pat. No. 5,568,621 issued Oct. 22, 1996, to Wooten; U.S. Pat. No. 5,621,900 issued Apr. 15, 1997 to Lane et al.; and "Pentium Pro Family Developer's Manual, Volume 2: Programmer's Reference Manual", pp. 8-5 through 8-6 (undated).

Subtractive decode agents may be bus bridges that interface the PCI bus to a bus operating according to a standard or set of protocols different than that associated with the PCI bus. Because the PCI bus standard only allows one subtractive decode agent on the bus, a computer system that incorporates a subtractive decode agent as a bus bridge limits the number of non-PCI buses that may be supported. For example, unless special accommodations are provided, the FIG. 1 system (discussed in greater detail ahead) would not be able to have two ISA busses, i.e., could not have both of an ISA bus 103 (provided as a peripheral bus within a desk-top computing system) and an ISA bus 117 (provided as a bus within a docked notebook computing system). It is desirable to be able to have a computer system that incorporates a PCI or other standard bus with more than one bus of a different standard.

Another disadvantage is that since there are multiple differing agents and differing agent locations on typical buses, a plurality of predetermined clock cycles (i.e., the "fast", "med", "slow" and "subtractive" cycles discussed above) are required to accommodate all such differing agents and locations, and redundant logic resources (e.g., logical gates, comparators, etc.) are required within the differing agents/locations for performing the decoding. A still further disadvantage is that since claiming of a PCI subtractive decoding takes the most clock signals to claim a transaction, a system having to wait for and accommodate subtractive decoding is slowed as extra clock cycles added by each subtractive decoding operation accumulate during operation of the system.

SUMMARY OF THE INVENTION

The present invention overcomes the above-mentioned limitations with respect to the background art. More particularly, the present invention relates to an input/output (I/O) decode arrangement including an I/O decode map in a form of a memory block and containing, before start of any bus I/O transactions, I/O address decode information useable for I/O address decoding for bus transaction ownership, for at least a portion of possible I/O addresses in a system.

BRIEF DESCRIPTION OF THE DRAWINGS

A better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing exemplary embodiments of the invention, it should be clearly understood that the same is by way of illustration and example only and is not to be taken by way of limitation, the spirit and scope of the present invention being limited only by the terms of the appended claims.

The following represents brief descriptions of the drawings, wherein:

FIG. 4A is one embodiment of address sourcing of the present invention, whereas

DETAILED DESCRIPTION OF THE INVENTION

Figure 1:
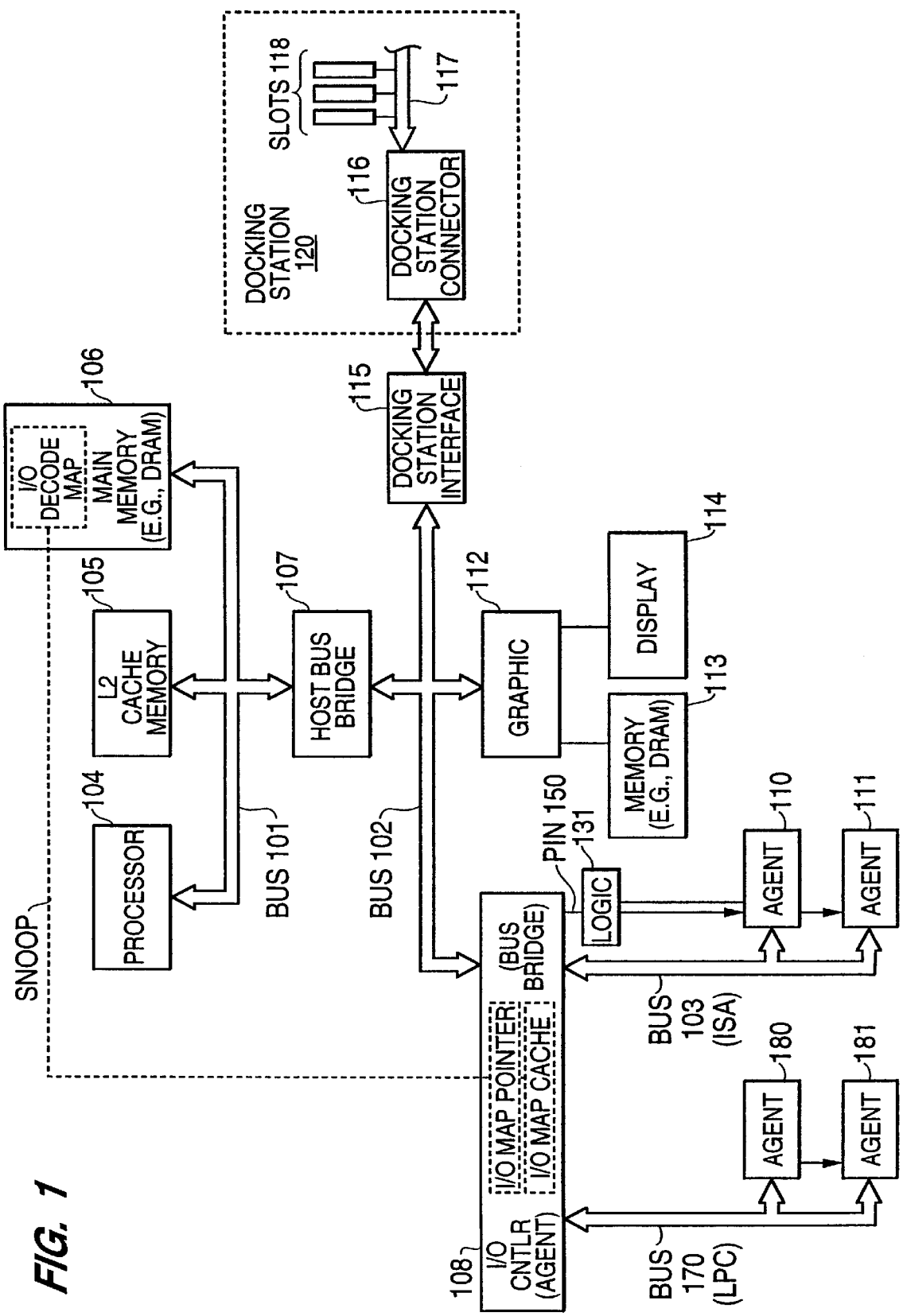
FIG. 1 is a block diagram of one embodiment of the computer system of the present invention.

Before beginning a detailed description of the subject invention, mention of the following is in order. When appropriate, like reference numerals and characters are used to designate identical, corresponding or similar components in differing FIG. drawings. Further, in the detailed description to follow, exemplary sizes/models/values/ranges may be given in parenthesis, although the present invention is not limited to the same. Still further, the clock and timing signal FIGS. are not drawn to scale, and instead, exemplary and critical time values are mentioned when appropriate. With further regard to timing signals, the terms assertion and negation are used during description in an intended generic sense to represent the fact that the invention is not limited to the particular illustrated/described "active-low" and "active-high" signals, but could be implemented with a total/partial reversal of any of the "active-low" and "active-high" signals by a simple change in logic. More specifically, the terms "assert" or "assertion" indicate that a signal is active independent of whether that level is represented by a high or low voltage, while the terms "negate" or "negation" indicate that a signal is inactive independent of level. As a final note, power connections to ICs and other components within the FIGS. are not shown for simplicity of illustration and discussion, and so as not to obscure the invention.

An arrangement, system and method for performing bus transactions in computer systems will now be described. More particularly, FIG. 1 is a block diagram of one embodiment of the present invention. The computer system includes a processor 104, a cache memory 105, and a main memory 106, which are coupled for communication via a host bus 101 for processing information. In one embodiment, processor 104 comprises an Intel Architecture Microprocessor, such as that manufactured by, for instance, Intel Corporation of Santa Clara, Calif., e.g., a Pentium®, Pentium II®, Pentium Pro®, etc. processor.

Cache memory 105 temporarily stores data and instructions during execution of instructions by processor 104. In one embodiment, cache memory 105 comprises a level two (L2) cache memory. Main memory 106 comprises a random access memory (RAM) or other storage device to store information and instructions to be executed by processor 104, and may be dynamic random access memories (DRAMs).

The present invention also includes a component bus 102 for communicating information in the computer system. In one embodiment, bus 102 conforms to the Peripheral Component Interconnect (PCI), local bus specification, revision 2.0 published Apr. 30, 1993 by the PCI Special Interest Group.

The computer system further comprises a host bus bridge 107 (e.g., an agent) that enables communication between bus agents coupled on a side of the host bus 101 and bus agents coupled on a side of the component bus 102. Host bus bridge 107 operates bi-directionally, i.e., "bridges" bus transactions originating on the side of the host bus 101 and targeted for agents (e.g., devices) on the side of the component bus 102, and vice versa. The operation and functionality of host bus bridge 107 of the present invention is well understood to those skilled in the art.

A variety of component systems may be coupled to component bus 102. In one embodiment, a docking station interface 115 and a docking station 120 couple a portable notebook computer to the computer system. The docking station 120 includes a docking station connector 116 coupled to a bus 117 including card slots 118. In one embodiment, bus 117 is a ISA bus and slots 118 are ISA slots. In an alternate embodiment, bus 117 and slots 118 could be a PCI bus and PCI slots, respectively. One of the slots may couple a communication sub-system to the component bus 102, e.g., a communication sub-system performing network communication switching hub functions via a set of communication links. The communication system is an intelligent input/output subsystem including a microprocessor controlling switching hub functions for the communication links.

Also coupled to bus component bus 102 is a graphical subsystem 112 that includes graphics controller, memory (e.g., DRAM) 113 and display 114 (such as a CRT or flat panel display). Although not shown, a disk controller subsystem may be coupled to bus 102, which subsystem enables access to a set of disk drives (not shown) coupled to a set of input/output buses. The disk control subsystem input/output subsystem may include a microprocessor that implements specialized control function for controlling access to the disk devices by the computer system.

Another bus 103 provides for communication between various devices coupled to bus 103. In one embodiment, bus 103 comprises an ISA bus, and ISA agents 110 and 111 which interface to bus 103 according to the ISA standard. Note that although two agents, 110 and 111, are shown coupled to bus 103, another number of agents may be coupled.

The computer system of the present invention may also include a read-only memory (ROM) and/or other non-volatile storage device coupled to bus 103 for storing static information and instructions for processor 104. An alpha-numeric input device, including alphanumeric and other keys, may also be included in the computer system via bus 103 for communicating information and command selections to processor 104. A cursor control device, such as a mouse, a trackball, trackpad, stylus, or cursor direction keys, may be included in the computer system via bus 103 for communicating direction information and command selections for processor 104, and for controlling cursor movement on a display. Also, a hard copy device may be included for printing instructions, data, or other information on a medium such as paper, film, or other similar types of media. Other types of agents coupled to bus 103 may comprise I/O devices, such as keyboards, disks, serial and parallel port controllers, etc.

Also coupled to bus 103 and to the component bus 102 is an I/O controller 108 which, in accordance with the present invention, can be configured to mutually operate as a decode agent and a bus bridge. I/O controller 108 enables bi-directional communication between bus agents coupled to a side of the component bus 102 (and host bus 101) and bus agents coupled to a side of the bus 103, such as agents 110 and 111. Accordingly, I/O controller 108, operating as a bus bridge includes logic to bi-directionally translate transactions from the PCI protocol to the protocol expected by devices on bus 103, and vice versa.

In one embodiment, agents 110 and 111 are coupled directly to the I/O controller 108 by bus 103. In another embodiment, bus agents 110, 111 are also coupled to the I/O controller 108 via logic 131. In one embodiment, logic 131 is coupled to one pin 150 of bus bridge 108. I/O controller 108 contains a set of configuration registers that are programmed by the basic input/output software (BIOS) of the computer system executed by the processor 104, and can be used to identify I/O controller 108 as at least partially operating as a PCI-ISA bus bridge, to bridge the PCI bus 102 and ISA bus 103.

The I/O controller 108 can further be adapted to operate according to the above-mentioned Low Pin Count (LPC) Interface Specification, whereupon a further bus 170 operates according to the LPC standard and has agents 180, 181, etc., disposed therealong. The computer industry plan under the LPC Interface Specification is that the ISA bus will no longer be provided in new systems by approximately 1999. Previous ISA legacy devices (e.g., floppy disk controllers and keyboard controllers) will be provided via the LPC interface, and would be plug-and-play-compliant under the Microsoft Windows® OS. Although two agents 180, 181 are shown coupled to LPC bus 170, another number of agents could be coupled, and could include motherboard devices. With the above arrangement, I/O controller 108, operating as a bus bridge includes logic to bi-directionally translate transactions from the PCI protocol to the protocol expected by devices on bus 170, and vice versa.

In one embodiment, because component bus 102 operates according to the PCI bus standard, it may contain only one subtractive decode agent as required within the widely accepted PCI standard. More particularly, since the PCI bus standard defines that a subtractive decode agent claims a bus transaction by default only after right of first refusal by the positive decode agents (i.e., only if there has been no positive decode claim within a predetermined number of clock cycles), there cannot be two subtractive decode agents existing along the bus 102 as each would independently claim the transaction by subtractive default and cause a conflict regarding transaction claiming. Accordingly, special accommodations must be provided if both the docking station interface 115 and the bus bridge 103 want to operate as subtractive decode agents.

As other relevant discussions, bus transactions occurring in the computer system are further elaborated on as follows. A bus transaction (including an address) is generated by a master and is sent on a bus (or buses) to a targeted agent or device. Note that the terms "agent" and "device" are used interchangably herein this description. In one embodiment, targeted agents may identify and determine ownership of a bus transaction by decoding an address associated with the transaction. These agents are referred to herein as positive decode agents. Upon performing a decode operation, a positive decode agent may determine ownership by matching the address of the transaction with one or more assigned addresses. Typical bus transactions may include read operations and write operations and operations requiring acknowledgement from a target.

Figure 2:
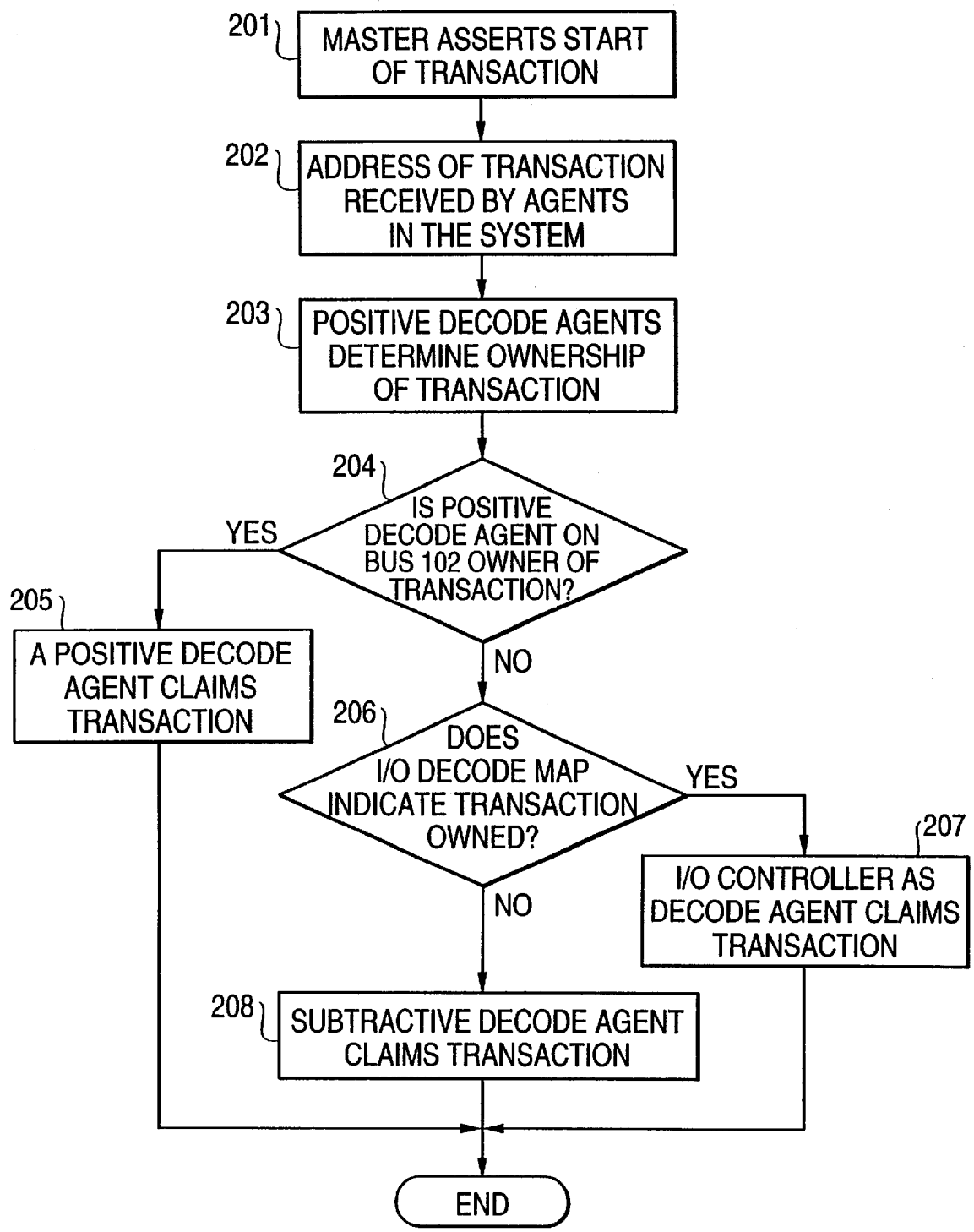
FIG. 2 is a flowchart of one embodiment of the process of performing bus transactions in the computer system of the present invention.
Figure 3:
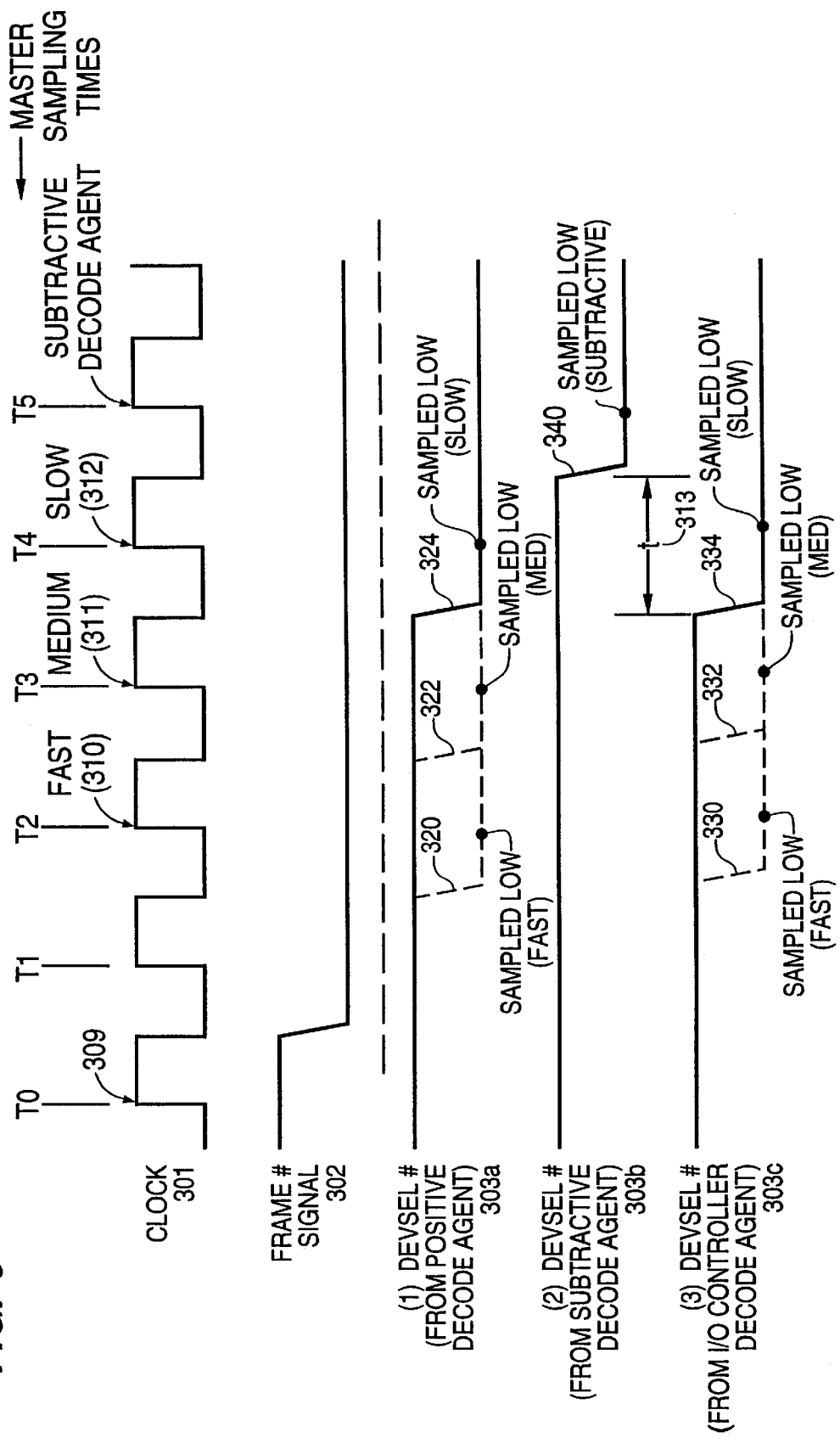
FIG. 3 is a timing diagram depicting timings with respect to bus transactions in the computer system of the present invention.

FIG. 2 is a flow diagram illustrating the process of executing a bus transaction in a computer system according to the teachings of the present invention, while FIG. 3 illustrates exemplary signals with respect to a clock 301. A bus transaction begins when a master asserts the start of the bus transaction (processing block 201). In one embodiment, a master asserts the start of a bus transaction by asserting a FRAME# signal (e.g., 302; FIG. 3). Note that the "#" signifies that the signal is active low. Alternatively, the start of a transaction may effected by a combination of multiple signals being asserted simultaneously, which signals may or may not be active low.

Next, the address associated with the transaction and indicating a destination is received by agents in the system (processing block 202). The address may be latched by these agents. Positive decode agents coupled to the bus (or buses) begin to determine ownership of the bus transaction (processing block 203). In one embodiment, the positive 18 decode agents (on busses 102, 101) determine ownership by comparing the address associated with the bus transaction to a set of one or more addresses assigned to the agent (e.g., stored in a register). If a positive decode agent on bus 102 (or bus 101) owns the transaction (processing block 204), then that agent claims the transaction (processing block 205) by asserting an appropriate device select (DEVSEL#) signal on an appropriate bus line (i.e., see low-transitioning "fast" 320, "med" 322 and "slow" 324 assertions associated with the FIG. 3 timing chart labelled "(1) DEVSEL# (FROM POSITIVE DECODE AGENT 303*a*)", and also the master sampling times).

Before continuing discussion of further FIG. 2 flowchart portions, discussion first turns to a first embodiment of an I/O decode map of the present invention, and an associated I/O map pointer, I/O map cache and snooping operation. Such first embodiment is advantageous in allowing plural non-PCI buses to coexist in the FIG. 1 arrangement. More particularly, the I/O decode map is shown in FIG. 1 as being contained within the main memory 106, but could be alternatively contained in a basic input/output system (BIOS) space. More particularly, the I/O decode map contains decode information before start of any bus I/O transactions, i.e., is present during initialization of the system. The actual location of such I/O decode map can be designated using a programmable base register, such as the I/O map pointer shown in the FIG. 1 I/O controller 108. Such I/O decode map is a block of memory (see FIG. 5) having information (e.g., asserted bits) used to determine I/O decode ranges (i.e., "owned" I/O addresses) when doing positive decoding. As one example, a system utilizing Intel architecture could have a memory block of 8K bytes which would cover decoding for an entire 64K I/O space.

Figure 5:
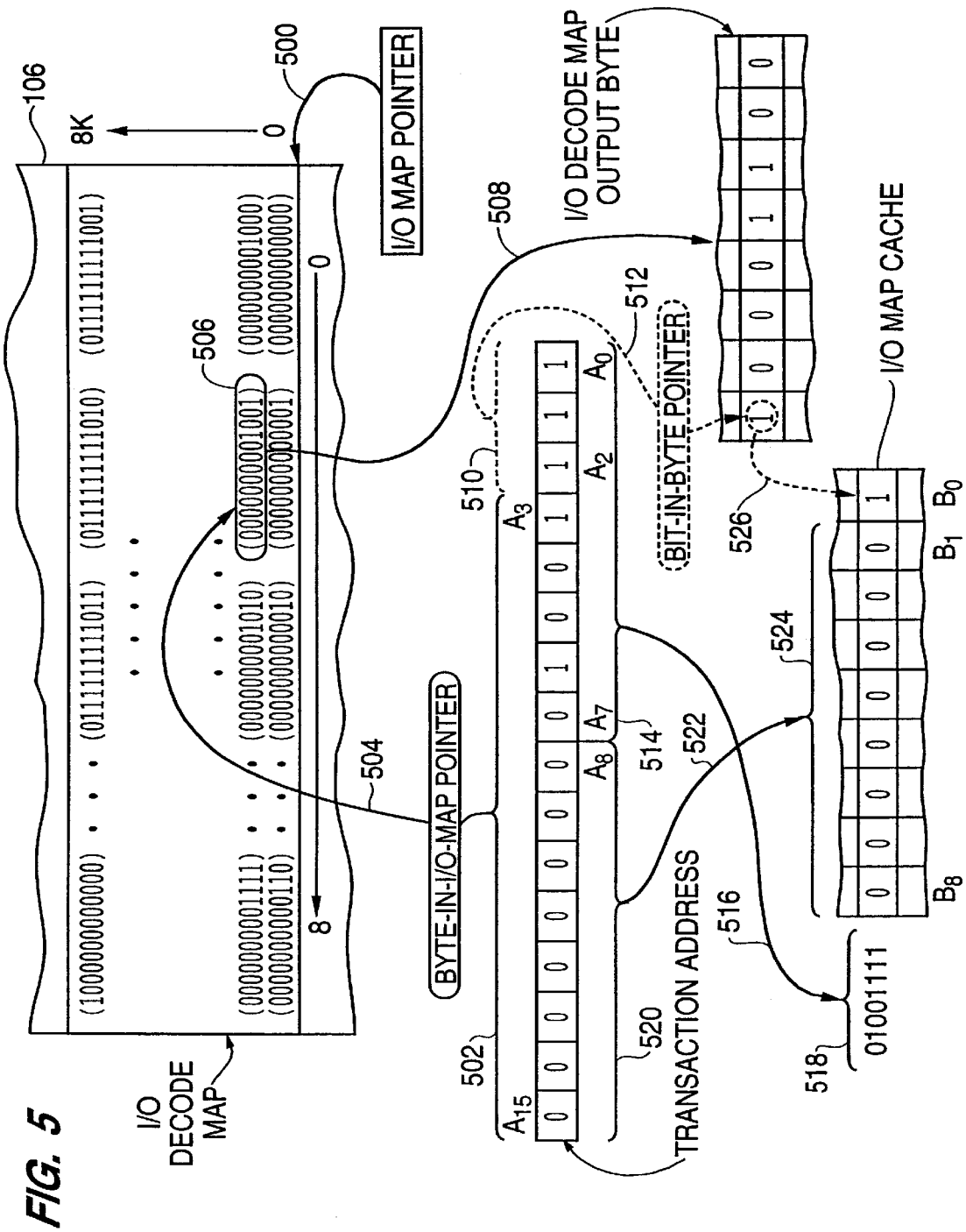
FIG. 5 is an illustration of an I/O decode map and a portion of an I/O map cache of one embodiment of the present invention, and one exemplary approach for accessing the same.

More particularly, FIGS. 1 and 5 are now used to describe the I/O decode map arrangement of the present invention, as well as the operation thereof. More specifically, in addition to the I/O decode map illustrated in the main memory 106 and the I/O map pointer illustrated within the I/O controller 108, there are also illustrated an I/O map cache (illustrated within the I/O controller 108) and a snoop operation SNOOP (represented in dashed line form extending between the I/O decode map and the I/O controller 108). The I/O map pointer points (designated by 500 in FIG. 5) to a reference location within main memory 106, such reference location being indicative of a known point (e.g., start or end) of the I/O decode map memory block. In the present exemplary discussions, the I/O map pointer points to a starting address (designated by "X" in FIG. 5) of the I/O decode map. Still further, assume that the I/O decode map occupies 8K spaces in the memory. As a 13 bit address can be used to access 8K spaces, each FIG. 5 I/O decode map byte location is represented by a thirteen bit address enclosed in parenthesis, such 13 bit address indicating an offset from the starting address "X".

At some point in time during bus operation, a master (e.g., processor 104) asserts the start of a bus transaction by asserting a FRAME# signal (e.g., 302; FIG. 3) and a transaction address (FIG. 5). In the exemplary discussion to follow, assume that the transaction is destined for ISA agent 110 along the ISA bus 103. The transaction address has 16 bits $A_0$–$A_{15}$ as illustrated in FIG. 5, with differing 16 bit addresses being able to designate differing respective ones of the 64K possible I/O spaces in the FIG. 1 system. FIG. 5 illustrates an exemplary such address, i.e., "0000000001001111". Upon receipt of an address, the I/O controller 108 checks (processing block 702 in FIG. 7) to see whether information corresponding to the received transaction address is already contained in the I/O map cache. In the beginning, assume that the I/O map cache is initially empty so that no match is found. The I/O controller then proceeds (processing block 704) to snoop the I/O decode map with the present transaction address, to retrieve relevant decode information.

More particularly, returning to the FIG. 5 illustration and especially the I/O decode map, differing 13 bit addresses are required to designate differing respective ones of the 8K bytes in the I/O decode map. Accordingly, the thirteen most-significant-bits (MSBs) $A_3$–$A_{15}$ (designated by 502 in FIG. 5) are used (together with the starting address "X" in FIG. 5) as a "byte-in-I/O-map pointer" 504, to point to a particular corresponding byte location 506 within the I/O decode map. At that byte location 506, there can be seen (designated by 508 in FIG. 5) a corresponding I/O decode map output byte, i.e., "10001100".

Once a particular I/O decode map output byte has been accessed, differing 3 bit addresses can be used to designate differing respective 3 ones of the 8 bits in the I/O decode map output byte. Accordingly, to further access decode information, the three least-significant-bits (LSBs) $A_0$–$A_2$ of the transaction address (designated by 510 in FIG. 5) are used as a "bit-in-byte pointer" 512, in order to point to a corresponding decode bit location within the I/O decode map. Such three bits can point to any of the 8 bits as follows: "000"=1st bit, "001"=2nd bit, "010"=3rd bit, "011"=4th bit, "100"=5th bit, "101"=6th bit, "110"=7th bit, and "111"=8th bit. Since, in this particular example, the three least-significant-bits (LSBs) $A_0$–$A_2$ of the transaction address designate the bits "111"=8th bit, the eighth bit in the I/O decode map output byte is referenced. More particularly, the transaction address "0000000001001111" points to this particular eighth bit within the I/O decode map. A logical "1" in this eighth bit location indicates that the transaction address "0000000001001111" is owned by an agent. Accordingly, the transaction address has been used to snoop the I/O decode map to access decode information corresponding to such transaction address.

Note that with respect to the exemplary FIG. 5 I/O decode map output byte "10001100", two other (i.e., the 3rd and 4th) bits besides the eighth bit are logical "1"s, indicating that two other transaction addresses are also indicated as being owned, i.e., transaction addresses "0000000001001011" and "0000000001001100". In contrast, a logical "0" decode bit within the I/O decode map output byte indicates that a transaction address corresponding thereto is not owned.

Figure 6:
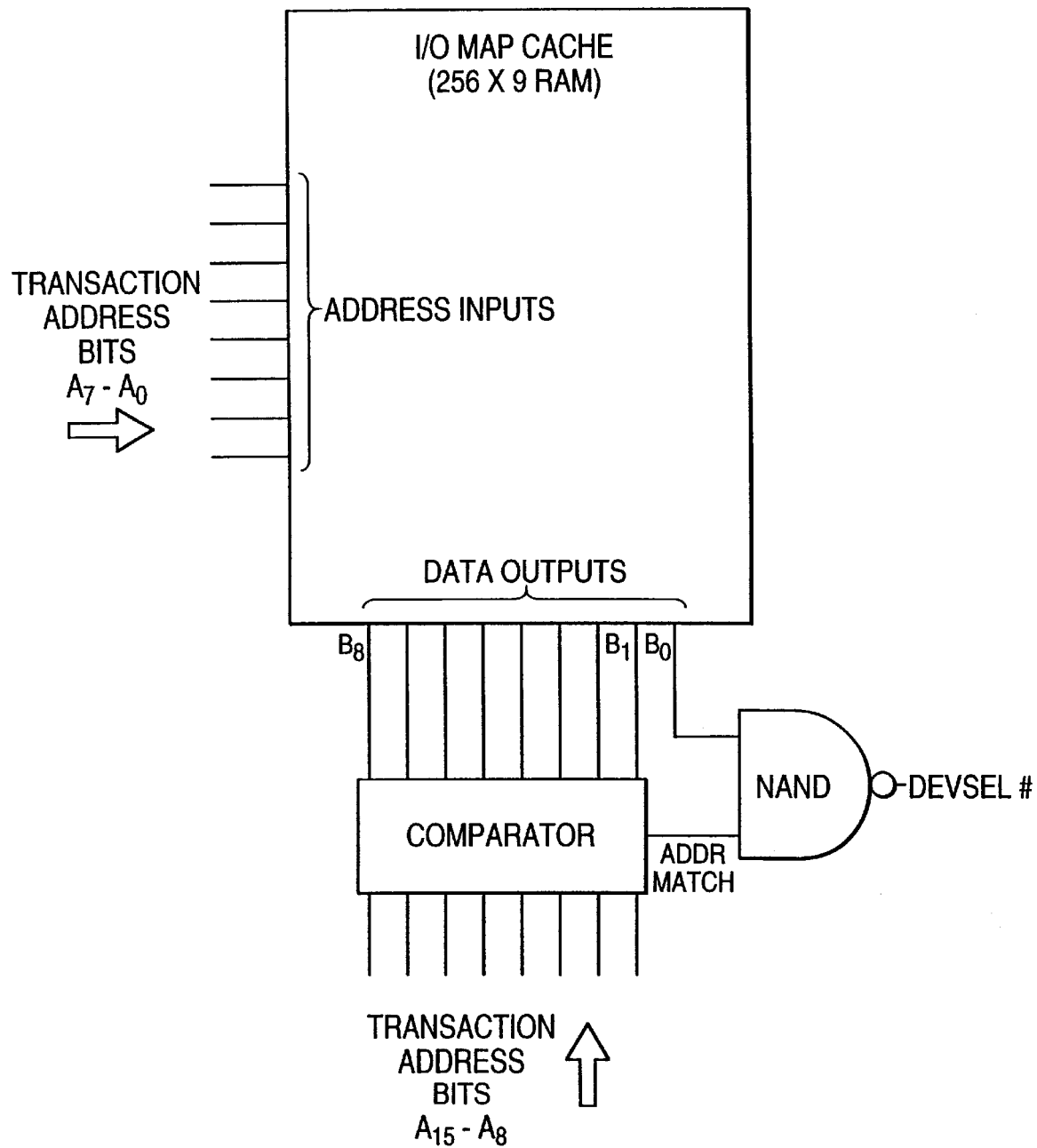
FIG. 6 is one embodiment of the I/O map cache, and one exemplary approach for accessing the same.
Figure 7:
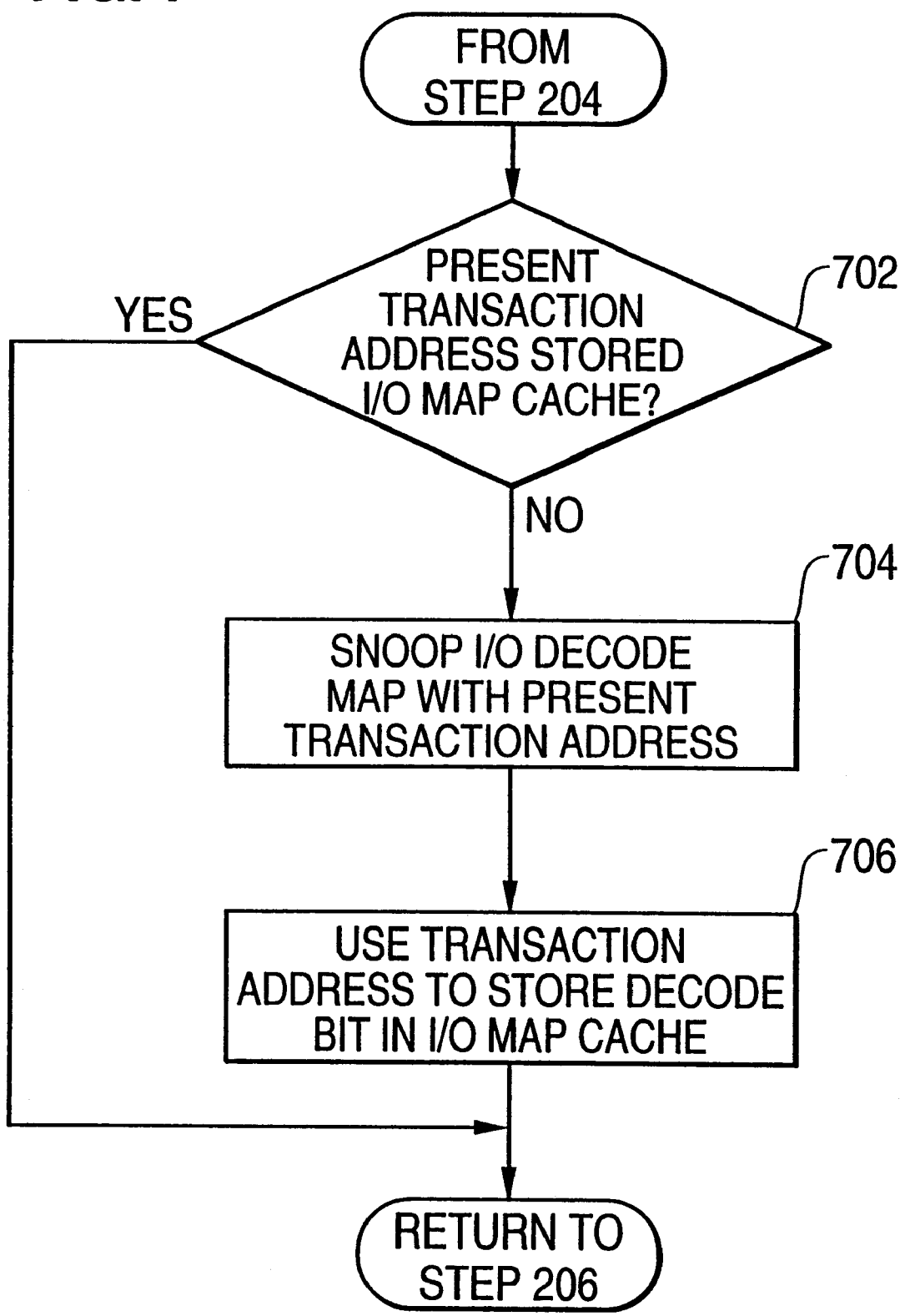
FIG. 7 is a flowchart of one embodiment of an approach for snooping/storing decode information with an embodiment of the present invention.

Discussion now turns to the final FIG. 7 processing block 706 of using the transaction address to store the decode bit in the I/O map cache. As shown in FIG. 6, the I/O map cache can be a 256×9 RAM, i.e., there are 256 memory locations, each having 9 bits stored. Differing 8 bit addresses are required to designate differing respective ones of the 256 I/O map cache memory locations. Accordingly, the eight least-significant-bits (LSBs) $A_0$–$A_7$ of the transaction address (designated by 514 in FIG. 5) are used as a I/O map cache address, to point (designated by 516, 518) to a particular corresponding memory location address within the I/O map cache. Next, the eight most-significant-bits (MSBs) $A_{15}$–$A_8$ of the transaction address (designated by 520 in FIG. 5) are stored (designated by 522) as the eight most-significant-bits (MSBs) $B_8$–$B_1$ (designated by 524) of the accessed I/O map cache location. Finally, the snooped decode bit "1" from the I/O decode map output byte is stored (designated by 526) as the least-significant-bit (LSB) $B_0$ of the accessed I/O map cache location. Thus, one cycle of snooping the I/O decode map, and storing snooped information within the I/O map cache has been completed.

Turning now to further relevant discussion, it should be noted that a time penalty is involved with the snooping of the I/O decode map and the storing of snooped information within the I/O map cache, i.e., snooping/storing (processing blocks 704, 706) requires a number of clock cycles which would substantially lengthen timing if required with each decoding operation. The use of the I/O map cache in the present invention is an attempt to minimize the impact of such time penalty. More particularly, in view of the fact that there is only a small number of actual I/O agents (i.e., devices) in a typical system and such I/O agents don't change much over time (i.e., the I/O agents within a system typically are static), the I/O map cache can be designed to be of a sufficient size to cache or store sufficient decode information covering only actual I/O agents within the system. Stated differently, while the I/O decode map has sufficient memory to contain decode information with respect to all possible 64K I/O spaces, the I/O decode map has a much smaller memory to contain decode information with respect to actually-existing I/O spaces used within the system. Once decode information for an I/O space has been snooped and stored once into the I/O map cache, there is no need for a second snooping/storing operation with respect to that I/O space, i.e., the FIG. 7 processing block 702 would result in a "yes" answer which would bypass processing blocks 704, 706, and immediately return to FIG. 2 processing block 206. Accordingly, the snooping/storing time penalty should be encountered only once with respect to each actually-existing I/O space. Alternatively, upon initialization of the system (e.g., during otherwise unused system times), the entire I/O decode map can be scanned, and decode information with respect to any set decode bits can be gleaned and stored into the I/O map cache, i.e., to avoid the snooping/storing time penalty during later actual I/O operations.

Discussion now returns to the FIG. 2 flowchart, and in particular, returns to the processing block 206 of determining whether the I/O decode map information indicates that a transaction address is owned. More particularly, in order to determine ownership, the I/O controller 108 uses the FIG. 6 approach to access decode bit information stored within the I/O map cache. First, upon receiving a transaction address, the eight least-significant-bits (LSBs) $A_0$–$A_7$ of the transaction address (designated by 514 in FIG. 5) are applied to address inputs of the FIG. 6 I/O map cache, to point (designated by 516, 518) to a particular corresponding memory location within the I/O map cache. As a result thereof, 9 bits $B_0$–$B_8$ within the accessed I/O map cache memory location are output from the cache data outputs. Data output bits $B_1$–$B_8$ are fed as first inputs to the FIG. 6 comparator. Next, the eight most-significant-bits (MSBs) $A_{15}$–$A_8$ of the transaction address (designated by 520 in FIG. 5) are fed as second inputs to the FIG. 6 comparator.

Data output bits $B_1$–$B_8$ and (MSBs) $A_{15}$–$A_8$ of the transaction address are respectively compared for a match within the FIG. 6 comparator. If a match is found between all bits, an appropriate logical level output (e.g., a "1") is output from the comparator as an ADDR MATCH output, and if no match is found, an opposite logical level output (e.g., a "0") is output.

Next, both of the ADDR MATCH output and the LSB $B_0$ (i.e., decode bit) of the I/O map cache data output are input to the FIG. 6 NAND gate. If both the ADDR MATCH and the LSB $B_0$ decode bit are a logical "1" (indicative of an address match and an owned transaction), such signifies that with respect to the present transaction address, I/O decode map information (stored in the I/O map cache) indicates ownership of the transaction address. Responsive to such signals, the NAND gate outputs a high-level-to-low-level transition, which is subsequently output by the I/O controller 108 as an asserted device select DEVSEL# signal on an appropriate bus line to positively claim the transaction (processing block 207), i.e., see low-transitioning "fast" 330, "med" 332 and "slow" 334 assertions associated with the FIG. 3 timing chart labelled "(3) DEVSEL# (FROM I/O DECODE AGENT 303c)").

Accordingly, it can be seen that the I/O controller 108 can thus act as a positive decode agent to positively claim a transaction. More specifically, in the presently-discussed embodiment, the I/O decode map (and thus the I/O map cache) is programmed to contain set (i.e., logical "1") decode bits for the I/O addresses owned by any of the agents 110, 111, 180, 181, etc. along the busses 103, 170 bridged by the I/O controller 108, and the I/O acts as a positive decode agent to decode and positively claim any transaction address designated for agents 110, 111, 180, 181, etc. The I/O controller can be further constructed/programmed to pass transaction addresses (represented by FIGS. 4A–4B) to the busses 103, 170 bridged by the I/O controller 108, i.e., either only when positively claiming a transaction address, or upon all transactions.

In one embodiment, the address is passed through bus bridge 108, wherein the path through bus bridge 108 is optimized to avoid delays. In another embodiment, the path of the address may be optimized by separating the address path from bus 102 (e.g., the PCI bus) connecting the same to the buses 103, 170 (e.g., I/O bus). Furthermore, the path may be optimized by minimizing routing and parasitics of the address path on the buses 102, 103, 170 and by using the fastest available buffers and gates. Such an implementation is representatively shown in FIG. 4A.

Figure 4B:
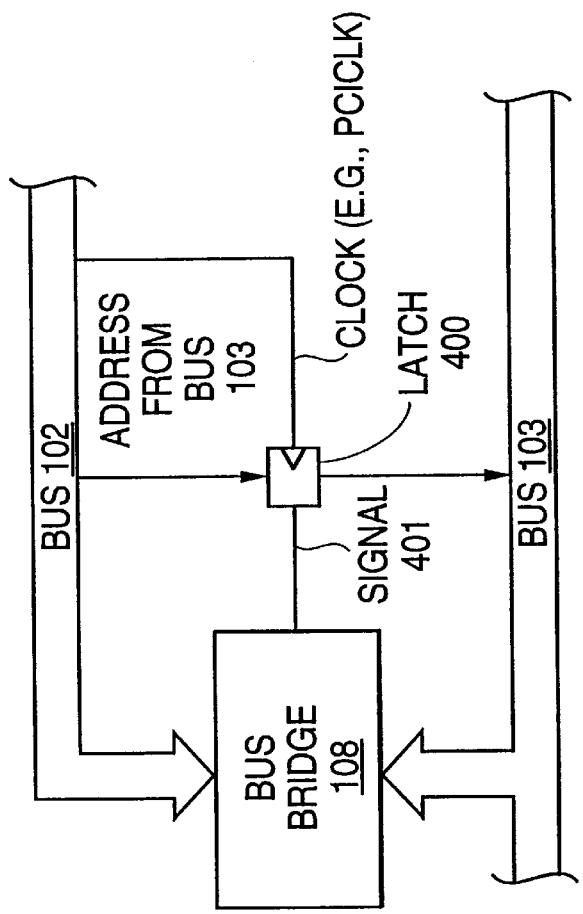
FIG. 4B is an alternate embodiment of address sourcing of the present invention.
Figure 4A:
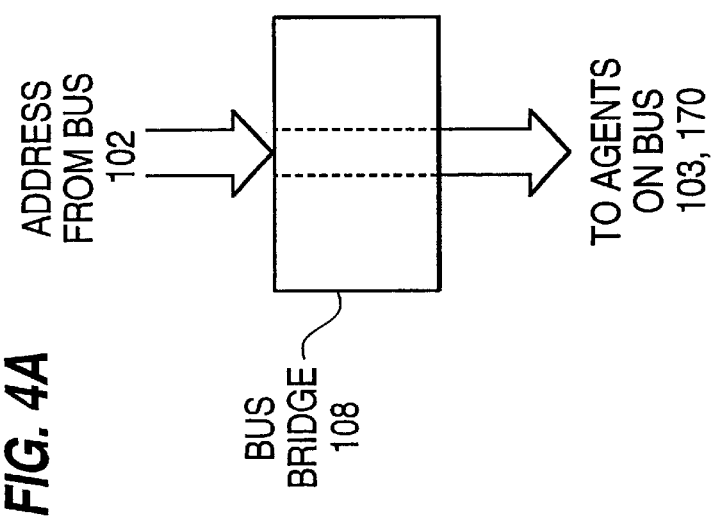

In another embodiment, the address is externally latched from bus 102. Note that in one embodiment, latching is required due to the PCI bus protocol, which calls for multiplexing addresses and data information on the same lines to the bus, such that the address would be lost if not latched. Note the address may be also latched from the host bus 101. An address latching implementation is shown in FIG. 4B, wherein latch 400 latches the address in response to signal 401 from bus bridge 108. In one embodiment, latch 400 comprises a D flip-flop with an active low clock enable that is clocked by a clock signal (e.g., the PCICLK). Agents (e.g., devices) on bus 103 (or bus 170) may then access latch 400 in a manner well-known in the art. Bus bridge 108 signals latch 400 in response to the FRAME# signal being asserted. That is, bus bridge 108 indicates the validity of the address in latch 400 based on signals on bus 102.

Regarding construction, the I/O controller 108 can include a microprocessor and/or application specific integrated circuit (ASIC) which is suitably programmed or arranged to provide the operations described within the flowcharts of the drawings, as well as any other operations discussed in a remainder of the present disclosure.

In continuing discussion of decoding, if no positive decode agent on bus 103 is the owner of the transaction (if no positive agent were to claim ownership within three PCI clocks), processing continues at the FIG. 2 processing block 208 where a subtractive decode agent coupled to component bus 102, if any, claims the transaction. In the exemplary FIG. 1 system, the docking station interface 115 would claim the transaction on behalf of the ISA bus 117. If no subtractive decode agent is coupled to component bus 102, transactions not claimed within a finite period of time are aborted, i.e., the master aborts the transaction.

Several further aspects/features of the present invention are important with respect to the presently-discussed embodiment. First, in contrast to having "set" I/O decode map bits for agents along the busses 103, 170, the I/O decode map (and thus the I/O map cache) is programmed (in this embodiment) to have unset (i.e., logical "0") decode bits for the I/O addresses owned by other agents existing along other busses 101, 102, 117. Accordingly, such agents existing along the other busses 101, 102, 117 continue to operates according to normal PCI decoding operations, i.e., I/O controller 108 will not positively claim transactions destined for such agents.

As a second aspect/feature, note that since the I/O controller 108 positively decodes and claims transactions for the normally subtractive ISA-type agents 110, 111, etc. along the ISA bus 103, such effectively allows the ISA-type agents 110, 111 to operate as "pseudopositive" agents within the presently-described embodiment. Accordingly, with such arrangement, the FIG. 1 system can have two (and even more) non-PCI busses operable simultaneously, i.e., can have the ISA bus 103 operating in a pseudo-positive sense (via the positive decoding performed by the I/O controller 108) and the docked notebook computer's ISA bus 117 operating under normal subtractive decoding operations.

Further discussion is relevant regarding timing of positive decodes in the presently described embodiment, i.e., regarding the timing of positive decodes of actual positive decode agents (along the busses 101, 102) versus the positive decodes of the I/O controller 108. More specifically, referencing the timing diagram of FIG. 3, the actual positive decode agents (along the busses 101, 102) can claim (FIG. 2 processing block 205) a transaction by asserting an appropriate DEVSEL# signal on an appropriate bus line at any of the low-transitioning "fast" 320, "med" 322 and "slow" 324 timings. Similarly, the I/O controller 108 can claim (FIG. 2 processing block 207) the transaction by asserting an appropriate DEVSEL# signal on an appropriate bus line at any of the low-transitioning "fast" 330, "med" 332 and "slow" 334 timings. That is, the timing of positive decodes of actual positive decode agents and the timing of the positive decodes of the I/O controller 108 may occur at common timings. Alternatively, each of the fast, med and slow timings can be assigned to specific types of agents, e.g., the positive decode agents along the busses 101, 102 can be constructed/programmed to assert DEVSEL# upon the fast and medium timings (320, 322), whereas the I/O controller

108 can be constructed/programmed to assert DEVSEL# upon the slow timing (334). The subtractive agents along the ISA bus 117 would be constructed/programmed to continue to assert DEVSEL# upon the normal subtractive timing (340).

The problem with the thus-far described embodiment, is that there are numerous agents distributed across the system performing decoding, thus requiring a plurality of predetermined clock cycles (i.e., the "fast", "med", "slow" and "subtractive" cycles discussed above to accommodate all such differing agents and locations), and further, distributed decoding requires a separate decoding arrangement within each of the numerous decoding agents. Such plurality of predetermined clock cycles (and especially the subtractive cycles) increases a number of clock cycles required, and thus slows an effective operating speed of the system. Further, distributed decoding arrangements mean wasteful redundancy which disadvantageously drives up the manufacturing costs (e.g., redundant logical gates, comparators and added inventory/assembly costs), operating costs (e.g., power consumption), and complexity of the system. A second embodiment of the present invention overcomes such limitations by having a single positive decode agent within the system.

More particularly, in a second embodiment, the I/O decode map (and thus the I/O map cache) is programmed to have "set" I/O decode map bits not only for I/O addresses owned by positive agents along the busses 103, 170, but also for the I/O addresses owned by other agents existing along other busses 101, 102. Accordingly, the I/O controller 108 will positively claim transactions destined not only for I/O addresses owned by positive agents along the busses 103, 170, but also for the I/O addresses owned by other agents existing along other busses 101, 102. A first advantage of having a single positive decode agent (i.e., I/O controller 108) within the system to positively claim all (i.e., positive and subtractive) transactions, is that such agent can be constructed to provide positive decoding and assertion at a single set predetermined time (i.e., predetermined clock cycle after the asserted FRAME# signal) which is consistent from transaction to transaction. For example, such single positive decode agent can be constructed to consistently output any assertions at the FIG. 3 "fast" 330 DEVSEL# cycle, thus eliminating the need for (i.e., the occurrence of) any of the "med" (322, 332), "slow" (324, 334), and "subtractive" (340) cycles. Elimination of such unnecessary cycles, in turn, increases an effective operating speed of the FIG. 1 system.

In addition to supplying the DEVSEL# signal back to the master, the single positive decode arrangement, in claiming bus transactions on the behalf of other agents, can also be constructed to inform respective agents that a bus transaction with respect to their I/O address has been asserted and/or claimed. Such can be done through sending appropriate information to the respective agent via the bus, or through a hard-wired connection.

As further relevant discussions, the I/O decode map of the present invention is not limited to the FIG. 5 exemplary configuration of 8K addressable memory locations by 8bits per memory location. More particularly, in order for the I/O decode map to have respective I/O decode map bits for all possible I/O addresses in the system and to have each I/O decode map bit contain I/O address decode information for a different one of the possible I/O addresses in the system, the following generic configuration should be followed, i.e., if there are $2^M$ (where M is an integer) possible I/O addresses in the system, and the I/O decode map is configured to have $2^{M-N}$ addressable memory locations (where N is an integer), then there must be $2^N$ bits per memory location Further, practice of the I/O decode map of the present invention is not limited to having respective I/O decode map bits for all possible I/O addresses in the system, i.e., the I/O decode map can be configured to have I/O decode map bits for a fewer number (i.e., a portion) of the possible I/O addresses in the system. For example, if the actual I/O agents within a system are all known to exist within a subset range of the possible I/O addresses in the system (e.g., are known to exist in the first half of possible I/O addresses), then the I/O decode map can be sized/configured only to the subset range, and any I/O agent having an I/O address outside of such subset range is assumed not to exist (i.e., such I/O address is not owned) in the system. Such limited I/O decode map embodiment is advantageous in terms of minimizing a size of a memory block used for the I/O decode map. Accordingly, in order to accommodate I/O decode maps of differing sizes/configurations, the FIG. 1 system can further be adapted to include I/O decode map size and/or configuration information, e.g., can have a memory arrangement (e.g., registers) having content designating a size and/or configuration of the I/O decode map.

Further, practice of the I/O decode map of the present invention is not limited to having respective singular I/O decode map bits for each possible I/O address in the system, or to containing only address decode information. As one example, a plurality of I/O decode map bits can be assigned to each possible I/O address, with ones of the plurality of bits being further used to designate a type of agent (e.g., ISA, PCI) having an address assigned thereto. Further, ones of the plurality of bits can be further used to provide sub-bus information designating to which bus (e.g., 103, 170) a transaction (i.e., I/O) address is assigned, and such sub-bus information can be used by the I/O controller 108 to control routing of the transaction address to an appropriate bus.

As a final note, as the above-mentioned Low Pin Count (LPC) Interface Specification gains wide acceptance, and as ISA buses get phased out from being included in newly manufactured system, most (if not all) I/O devices (e.g., previous ISA legacy devices such as floppy disk controllers and keyboard controllers; docking station interface 115) will migrate to the LPC bus 170, e.g., a single LPC bus 170 extending from the I/O controller 108. Accordingly, it can be seen that the above-described embodiment having I/O decode information with respect to all agents/devices being provided within the I/O decode map, and having all bus transaction decoding/assertions performed by I/O controller 108, may become the most desirable arrangement within a computing system.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An input/output (I/O) decode arrangement comprising:
an I/O decode map in a form of a memory block and containing, before start of any bus I/O transactions, I/O address decode information for positive claiming of bus transaction ownership, for at least a portion of possible I/O addresses in a system, with said I/O decode map sub-divided in its entirety into a plurality of sub-byte portions, and with each sub-byte portion of said I/O decode map containing positive claiming information for a different one of said at least a portion of said possible I/O addresses in the system.

2. An arrangement as claimed in claim 1, wherein said I/O decode map more specifically contains decode information for all possible I/O addresses in the system.

3. An arrangement as claimed in claim 2, wherein if there are $2^M$ (where M is an integer) possible I/O addresses in the system, said I/O decode map more specifically has $2^{M-N}$ addressable memory locations (where N is an integer), and $2^N$ bits per memory location, with each I/O decode map bit containing said I/O address decode information for a different one of said possible I/O addresses in the system.

4. An arrangement as claimed in claim 3, wherein if a bus transaction address has M bits, said I/O decode map is adapted such that a first M–N subset of said M bits determines an I/O decode map address for accessing said $2^N$ bits within said I/O decode map which corresponds to said bus transaction address, and an unused N subset of said M bits determines a said I/O decode map bit within an accessed said $2^N$ bits which corresponds to said bus transaction address.

5. An arrangement as claimed in claim 3, wherein if there are $2^M$ (where M is 16) possible I/O addresses in the system, said I/O decode map more specifically has $2^{M-N}$ addressable memory locations (where N is 3), and $2^N$ bits per memory location, with each I/O decode map bit containing said I/O address decode information for a different one of said possible I/O addresses in the system.

6. An arrangement as claimed in claim 1, wherein said I/O decode map more specifically is located within at least one of system management memory (SMM) or basic input/output system (BIOS) memory space.

7. An arrangement as claimed in claim 1, further comprising:
an I/O decode map pointer adapted to point to a memory address where said I/O decode map is located;
an I/O decode cache adapted to cache said decode information with respect to ones of I/O addresses of which accessing has been previously performed with respect to said I/O decode map; and
an I/O snooper/storer adapted to snoop said I/O decode map with any I/O address to retrieve said decode information corresponding to said I/O address, and further adapted to store retrieved said decode information into said I/O decode cache.

8. An input/output (I/O) decode arrangement comprising:
an I/O decode map means in a form of a memory means for storing, before start of any bus I/O transactions, I/O address decode information for positive claiming of bus transaction ownership, for at least a portion of possible I/O addresses in a system, with said I/O decode map means sub-divided in its entirety into a plurality of sub-byte portions, and with each sub-byte portion of said I/O decode map means containing positive claiming information for a different one of said at least a portion of said possible I/O addresses in the system.

9. An arrangement as claimed in claim 8, wherein said I/O decode map means more specifically is for storing decode information for all possible I/O addresses in the system.

10. An arrangement as claimed in claim 9, wherein if there are $2^M$ (where M is an integer) possible I/O addresses in the system, said I/O decode map means more specifically has $2^{M-N}$ addressable memory locations (where N is an integer), and $2^N$ bits per memory location, with each I/O decode map bit containing said I/O address decode information for a different one of said possible I/O addresses in the system.

11. An arrangement as claimed in claim 10, wherein if a bus transaction address has M bits, said I/O decode map is adapted such that a first M–N subset of said M bits determines an I/O decode map address for accessing a said $2^N$ bits within said I/O decode map means which corresponds to said bus transaction address, and an unused N subset of said M bits determines a said I/O decode map bit within an accessed said $2^N$ bits which corresponds to said bus transaction address.

12. An arrangement as claimed in claim 10, wherein if there are $2^M$ (where M is 16) possible I/O addresses in the system, said I/O decode map means more specifically has $2^{M-N}$ addressable memory locations (where N is 3), and $2^N$ bits per memory location, with each I/O decode map bit containing said I/O address decode information for a different one of said possible I/O addresses in the system.

13. An arrangement as claimed in claim 8, wherein said I/O decode map means more specifically is located within at least one of system management memory (SMM) or basic input/output system (BIOS) memory space.

14. An arrangement as claimed in claim 8, further comprising:
an I/O decode map pointer means for pointing to a memory address where said I/O decode map means is located;
an I/O decode cache means for caching said decode information with respect to ones of I/O addresses of which accessing has been previously performed with respect to said I/O decode map means; and
an I/O snooper/storer means for snooping said I/O decode map means with any I/O address to retrieve said decode information corresponding to said I/O address, and for storing retrieved said decode information into said I/O decode cache means.

15. A computing system comprising:
a microprocessor;
a memory;
at least one bus;
a plurality of agents connected to said at least one bus, with each agent having at least one I/O address assigned thereto; and
an input/output (I/O) decode arrangement comprising:
an I/O decode map in a form of a memory block and containing, before start of any bus I/O transactions, I/O address decode information for effecting positive claiming of bus transaction ownership, for at least a portion of possible I/O addresses in the computing system, with said I/O decode map sub-divided in its entirety into a plurality of sub-byte portions, and with each sub-byte portion of said I/O decode map containing positive claiming information for a different one of said at least a portion of said possible I/O addresses in the system.

16. A computing system as claimed in claim 15, wherein said I/O decode map more specifically contains decode information for all possible I/O addresses in the computing system.

17. A computing system as claimed in claim 16, wherein if there are $2^M$ (where M is an integer) possible I/O addresses in the computing system, said I/O decode map more specifically has $2^{M-N}$ addressable memory locations (where N is an integer), and $2^N$ bits per memory location, with each I/O decode map bit containing said I/O address decode information for a different one of said possible I/O addresses in the computing system.

18. A computing system as claimed in claim 17, wherein if a bus transaction address has M bits, said I/O decode map is adapted such that a first M−N subset of said M bits determines an I/O decode map address for accessing a said $2^N$ bits within said I/O decode map which corresponds to said bus transaction address, and an unused N subset of said M bits determines a said I/O decode map bit within an accessed said $2^N$ bits which corresponds to said bus transaction address.

19. A computing system as claimed in claim 17, wherein if there are $2^M$ (where M is 16) possible I/O addresses in the computing system, said I/O decode map more specifically has $2^{M-N}$ addressable memory locations (where N is 3), and $2^N$ bits per memory location, with each I/O decode map bit containing said I/O address decode information for a different one of said possible I/O addresses in the computing system.

20. A computing system as claimed in claim 15, wherein said I/O decode map more specifically is located within at least one of system management memory (SMM) or basic input/output system (BIOS) memory space of the computing system.

21. A computing system as claimed in claim 15, wherein said input/output (I/O) decode arrangement further comprises:

an I/O decode map pointer adapted to point to a memory address where said I/O decode map is located;

an I/O decode cache adapted to cache said decode information with respect to ones of I/O addresses of which accessing has been previously performed with respect to said I/O decode map; and an I/O snooper/storer adapted to snoop said I/O decode map with any I/O address to retrieve said decode information corresponding to said I/O address, and further adapted to store retrieved said decode information into said I/O decode cache.

22. An input/output (I/O) decode method comprising the steps of:

providing an I/O decode map in a form of a memory block and which contains, before start of any bus I/O transactions, I/O address decode information for positive claiming of bus transaction ownership, for at least a portion of possible I/O addresses in a system, with said I/O decode map sub-divided in its entirety into a plurality of sub-byte portions, and with each sub-byte portion of said I/O decode map containing positive claiming information for a different one of said at least a portion of said possible I/O addresses in the system; and using said I/O address decode information for performing address decoding for bus transaction ownership.

23. A method as claimed in claim 22, wherein said I/O decode map more specifically contains decode information for all possible I/O addresses in the system.

* * * * *